United States Patent [19]

Cardinal

[11] Patent Number: 5,192,177
[45] Date of Patent: Mar. 9, 1993

[54] MOBILE HARVESTER FOR HAY BALES

[76] Inventor: Marcel E. Cardinal, 5451, Rg. St-Vincent, Mirabel, Quebec, Canada, J0N 1K0

[21] Appl. No.: 867,452

[22] Filed: Apr. 13, 1992

[51] Int. Cl.$^5$ .............................................. B60P 1/38
[52] U.S. Cl. ................................... 414/501; 414/502; 414/789.7; 414/528
[58] Field of Search ............... 414/501, 502, 503, 504, 414/505, 527, 528, 789.9, 790.3, 111, 789.7, 499, 24.5, 24.6

[56] References Cited

U.S. PATENT DOCUMENTS

| | | | |
|---|---|---|---|
| 3,010,593 | 11/1961 | Adams et al. | 414/502 |
| 3,385,456 | 5/1968 | Snider | 414/789.7 |
| 4,101,081 | 7/1978 | Ritter et al. | 414/528 X |
| 4,204,792 | 5/1980 | Wynn et al. | 414/501 X |
| 4,310,275 | 1/1982 | Hoelscher | 414/501 X |
| 4,844,675 | 7/1989 | Strosser et al. | 414/789.7 X |

FOREIGN PATENT DOCUMENTS

| | | | |
|---|---|---|---|
| 72455 | 11/1974 | Australia | 414/501 |
| 807895 | 3/1969 | Canada | 414/502 |
| 2482531 | 11/1981 | France | 414/528 |

*Primary Examiner*—Frank E. Werner
*Attorney, Agent, or Firm*—Roland L. Morneau

[57] ABSTRACT

A mobile harvester for loading and unloading hay bales made of a loading and unloading platform. The loading platform is positioned adjacent to and sidewise relative to a receiving platform which is adapted to individually and successively supply single rows of bales transversely on the loading platform. A first conveyor mechanism is mounted on the loading platform for longitudinally moving the bale with transversal channels for allowing the bales to transversaly slide thereof and to longitudinally move the bales upon actuation of the first mechanism. The unloading platform is adjacently positioned lengthwise relative to said loading platform for receiving the bales from the loading platform when said first conveyor mechanism is moving. The unloading platform has a supporting surface which comprises a second conveyor mechanism for consecutively moving the bales longitudinally from one end substantially at the same level as the first mechanism to an end of the unloading platform opposite the loading platform. First and second motors for actuating the first and second conveyor mechanisms are provided. The unloading platform is leaning in the direction of said opposite end and has a skate member located at the opposite end and under the unloading platform. The skate member is adapted to slide on the ground when the harvester is moving.

8 Claims, 8 Drawing Sheets

MOBILE HARVESTER FOR HAY BALES

BACKGROUND OF THE INVENTION

1. Field of the Invention

The present invention relates to a mobile harvester and more specifically to mobile hay bale retrieving loading and unloading platforms for receiving already formed bales from a baler. The unloading platform is slanted to be in contact with the ground for discharging the bales while the mobile harvester is moving.

The harvester is particularly suitable for large quantities of hay bales which may be discharged on the ground at any suitable location. The system allows every discharge operation to take place within a specific area so that the hay bales may be picked up by a non-mobile transfering device. Considering the large quantity of hay bales which may be accumulated by the novel harvester, the platforms are provided with conveyors for moving the hay bales from one platform to another and finally for moving all the hay bales from a slanted platform onto the ground at specific locations.

2. Prior Art

U.S. Pat. No. 4,310,275 describes a tiltable platfrom hay bale accumulator which has a flat static platform on which the hay bales are slidden by being pushed one against the other. The same and single platform is provided with a tilting mechanism for dropping the hay bales when the platform is fully loaded.

In this patent, the surface of the platform is smooth and relatively small so that the hay bales will slide out of the platform when the latter is fully loaded and tilted. The hay bales will be dropped at random on the field while the pulling tractor moves over the field and whenever the platform is loaded.

SUMMARY OF THE INVENTION

The hay bale retrieval, loading and unloading platforms according to the present invention comprises an elongated hay retrieving platform on which successive single rows of sidewisely adjacent bales are adapted to be longitudinally slidden thereon. Adjacently positioned sidewise relative to the retrieving platform is a loading platform which is substantially at the same level as the receiving platform which receives, individually, rows of bales which are tilted from the retrieval platform. The rows of bales are adapted to be pushed transversally on the loading platform when a following row of bales is tilted on the loading platform. The loading platform is provided with a first conveyor mechanism for moving the loaded bales in a direction perpendicular to the direction they are pushed onto the loading platform from the retrieving platform. The first conveyor mechanism may be activated by a sensor positioned on the loading platform at a location opposite the retrieving platform when the latter is fully loaded. An unloading platform is adjacently positioned lengthwise relative to the loading platform for receiving the rows of bales from the loading platform when the first conveyor mechanism is actuated. The unloading platform has a second conveyor mechanism for consecutively moving the bales until they reach the far end of the unloading platform opposite the loading platform. The conveyors are generally actuated by an operator in a tractor pulling the hay baler 10 and are preferably actuated simultaneously by the same control device. The bales are automatically stopped on the unloading platform before they are intentionally unloaded on the ground. The unloading platform leans from the level of the loading platform to the level of the ground. The slope of the unloading platform is permanently maintained when the second conveyor or both conveyors are activated to allow the rows of bales to smoothly slide onto the ground.

DETAILED DESCRIPTION OF THE INVENTION

Figure 1:
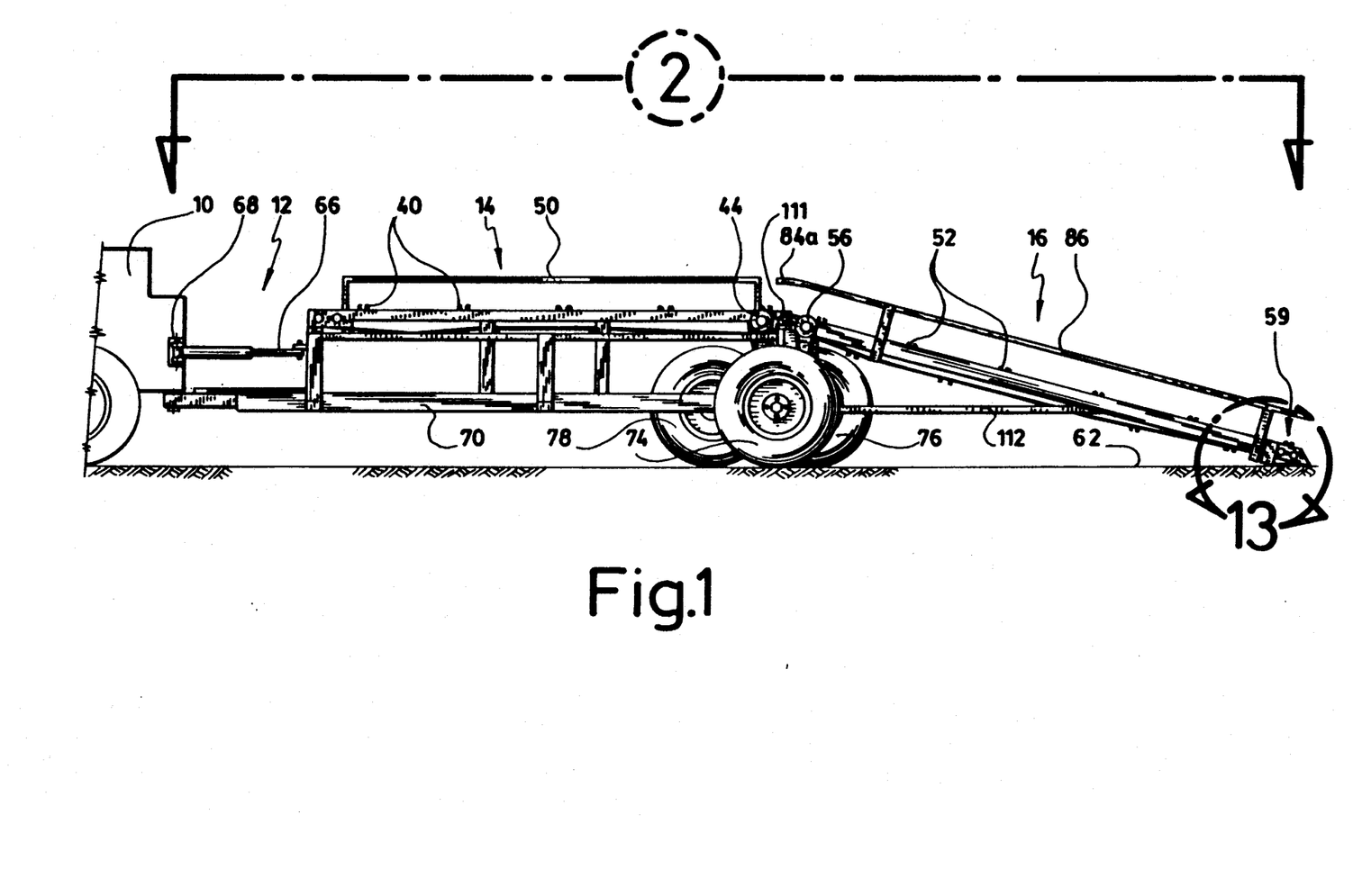
FIG. 1 is a side view of the harvester according to the invention.
Figure 2:
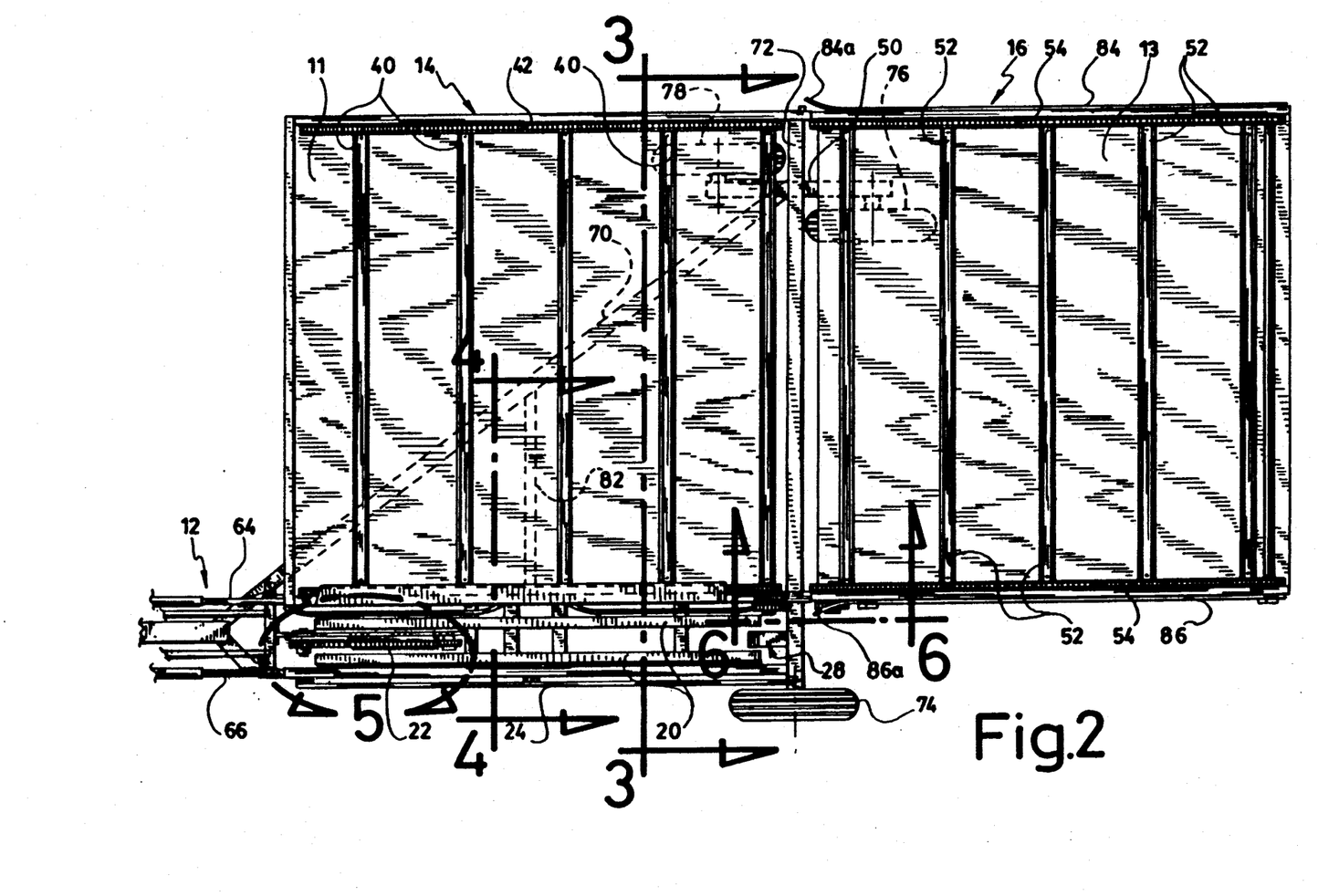
FIG. 2 is a top view of the harvester shown in FIG. 1 seen along arrow 2 in FIG. 1.
Figure 4:
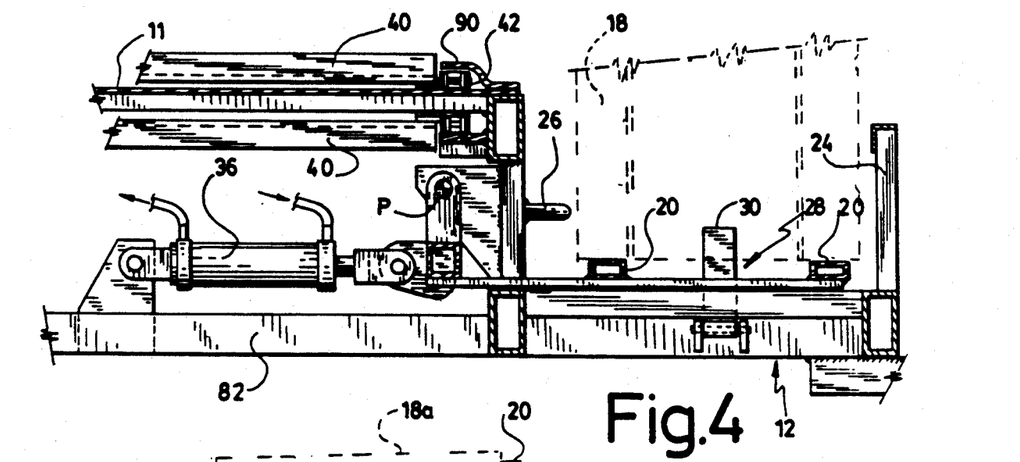
FIG. 4 is a cross-sectional view taken along line 4—4 of FIG. 2.

FIGS. 1 and 2 illustrate the mobile harvester adapted to be hooked behind a hay baler 10. It includes essentially three main parts comprising a retrieving or receiving platform 12, a loading platform 14 and a unloading platform 16. The hay bales which have been formed and tied up by the hay baler are individually pushed along the receiving platform 12 which longitudinally lies adjacent the loading platform 14. The hay bales 18 as shown in the dotted lines in FIG. 4, are pushed by the hay baler 10 along a pair of supporting rigid strips 20 by a chain and sprocket mechanism 22. The bales 18 are laterally guided by an exterior ramp 24 and an internal ramp 26. The internal ramp 26 has an additional function which will be explained later.

Once a first bale 18 rides on the strips 20, the following one will push the preceding one until three bales are standing in a single row on the receiving platform 12. At that stage, the first bale on the receiving platform 12 hits a sensor device 28 which is characterized by a lever 30 adapted to tilt when pushed by the first bale so as to operate a microswitch 32. This operation is particularly shown in FIG. 16. It is pointed out that the chain and sprocket mechanism 22 is slightly shorter than the length of a bale, so that only two bales cannot reach the lever 30 without a third bale.

Figure 4A:
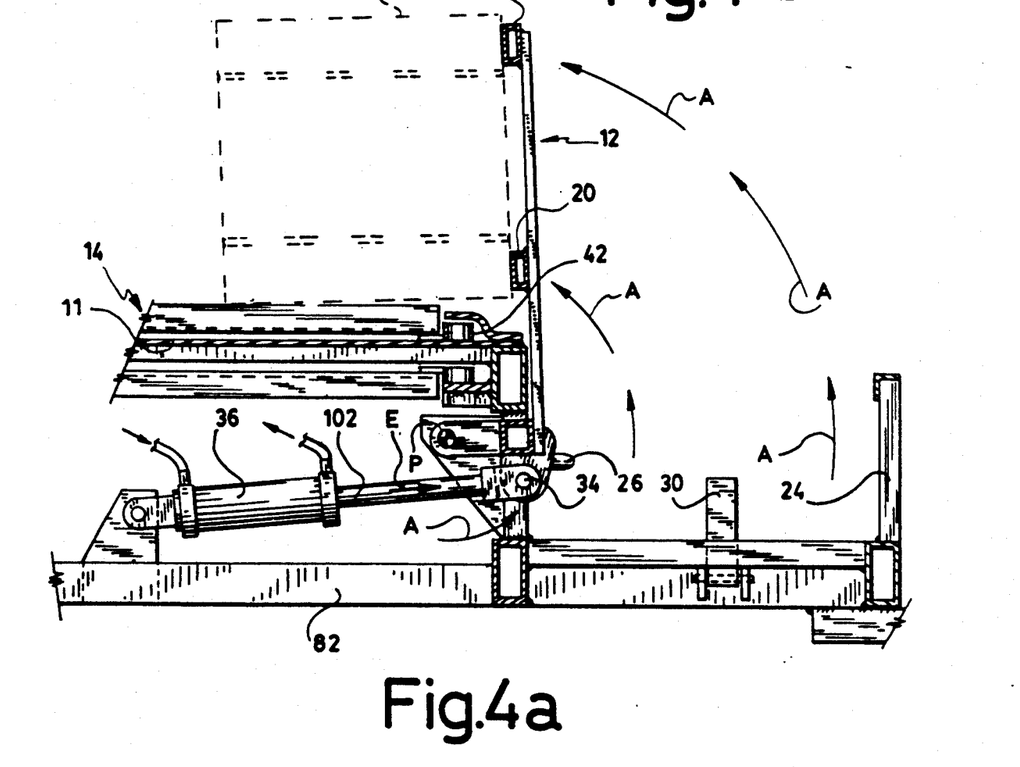
FIG. 4a is a view similar to FIG. 4 with a receiving platform in a raised position.
Figure 5:
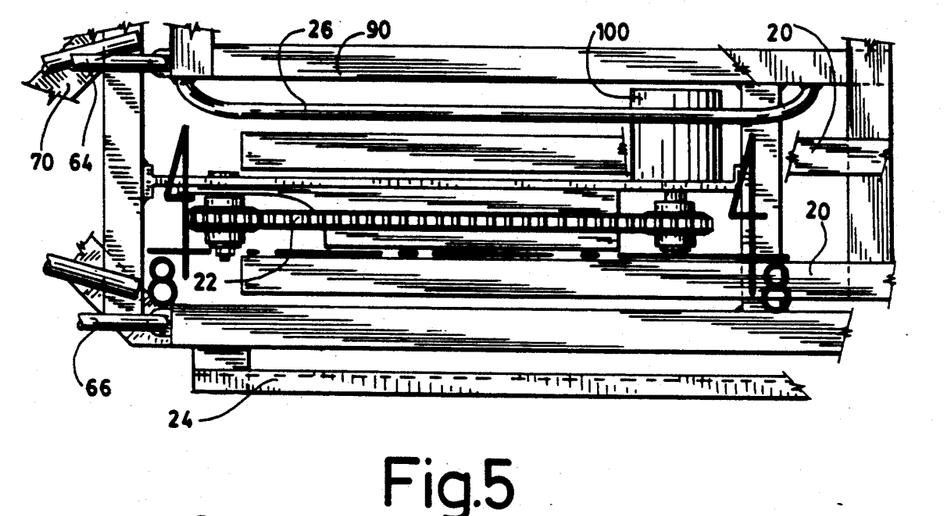
FIG. 5 is an enlarged view of encircled portion 5 shown in FIG. 2.

At that stage, the receiving platform 12 is tilted upwardly about the pivoting axle P by a hydraulic piston 36 axially fixed at 34. The arrows A shown in FIG. 4a indicates the pivoting direction of the receiving platform 12. The hay bales 18 which were standing on the horizontal receiving platform 12 are raised and dropped on the loading platform 14 as shown in FIG. 4a. This tilting operation is particularly well performed with the help of the internal ramp 26 which maintains the bale 18 away from the loading platform 14 during the first part of the tilting operation thus preventing the bales 18 from being squeezed during their tilting operation. Furthermore, it is pointed out that the duration of the tilting operation may be made relatively short so that the receiving platform 12 returns to its original horizontal position before the next bale, coming from the hay baler 10, is ready to slide on the receiving platform 12. In practice, the chain 22 stops when the receiving platform 12 tilts.

When the next three hay bales lies on the receiving platform 12, and the sensor device 28 is actuated, the platform 12 is again tilted and the three following bales are adapted to push on the three preceding bales 18a as shown in FIG. 4a, so that the latter will transversely slide and make way for the three following hay bales.

Figures 3, 7:
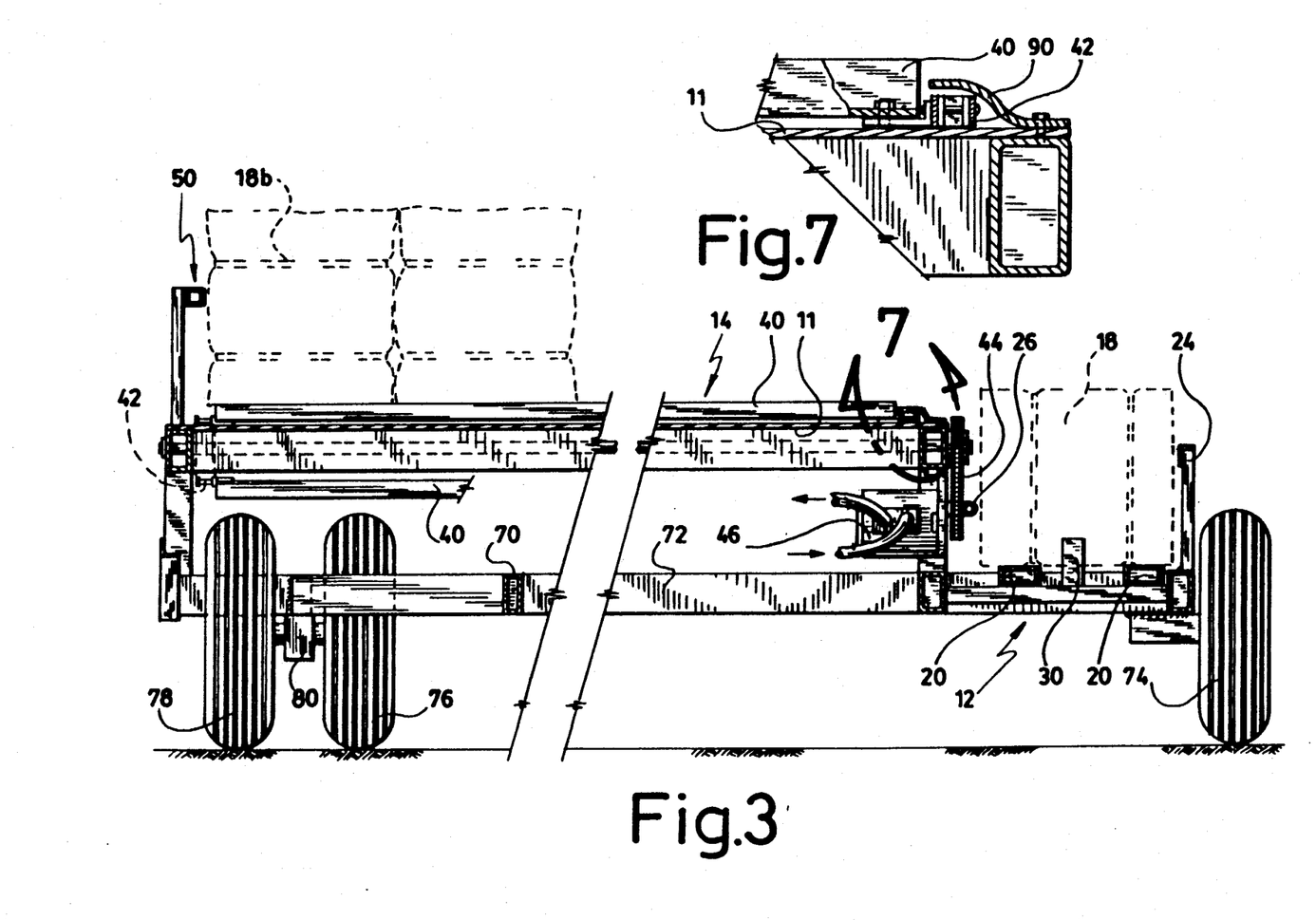
FIG. 3 is a cross-sectional view along line 3—3 of FIG. 2.
FIG. 7 is an enlarged view of encircled portion 7 shown in FIG. 3.

The loading platform 14 is adapted to receive a plurality rows of bales according to the same procedure described above and is especially intended to receive 7 rows of three aligned bales which makes a total of 21 bales covering the loading platform 14. The loading platform 14 is particularly made of a series of U-shaped channels 40 perpendicularly oriented relative to the receiving platform 12. Each of the channels 40 are secured at each end to a driving chain 42 which is actuated in the direction of the arrow C by a sprocket arrangement mechanism 44 driven by a motor 46. The motor 46 which is usually a hydraulic motor is actuated by an operator when the loading platform 14 is covered with 21 hay bales. The operation of the motor 46 is also contemplated to be automatically actuated by a sensor device similar to device 28 which would be mounted on the rearward ramp 50 (FIG. 3) of the loading platform 14 and which would be actuated by the rearmost bale 18b as shown in FIG. 3. The actuation of the motor 46 causes the bales located over the loading platform 14 to be gripped by the U-shaped channels and to move in the direction of the unloading platform 16.

The unloading platform 16 is substantially made in the same manner as the loading platform 14 and particularly includes a plurality of U-shaped channels 52 disposed parallel to the channels 40. The channels 52 are moved by driving chains 54 and the sprocket mechanism 56 which is actuated by the hydraulic motor 58.

The combination of one of the platforms 14 or 16 with their corresponding chains 42 and 54, their channels 40 and 52 and their sprocket mechanisms 44 and 56 may be referred to as conveyor mechanisms.

The unloading platform 16 is leaning backward downwardly from its forward upper end which is substantially at the same level as the loading platform 14 and the lower end is provided with skate members which are in contact with the ground and are adapted to slide on the ground when the harvester is moving forwardly. When the hay bales leaves the loading platform 14 in the direction of the unloading platform 16, they are picked up by the U-shaped channels 52 and are brought to cover the unloading platform 16. Both the loading and unloading platforms 14 and 16 have an equal area which allows the 21 bales on the loading platform 14 to cover the area of the unloading platform 16. When the loading platform 14 has been evacuated and before the bales, on the unloading platforms, slides out of the unloading platform, to reach the ground, the motor 46 is deactivated by a sensor device (not shown) on the arm 50 (see FIG. 3) to allow the loading platform 14 to be loaded with 21 subsequent bales coming from the receiving platform 12. The unloading platform is spaced from the loading platform to leave a gap between both groups of bales. At that stage or at any previous or subsequent stages, the hay bales are adapted to be dropped on the ground at a specific location so that all the bales will be dropped within a predetermined location whether they are unloaded at any trip along the back and forth pathway followed by the harvester. The procedure for unloading the bales will be explained in greater detail later.

Figures 13, 14, 15, 16:
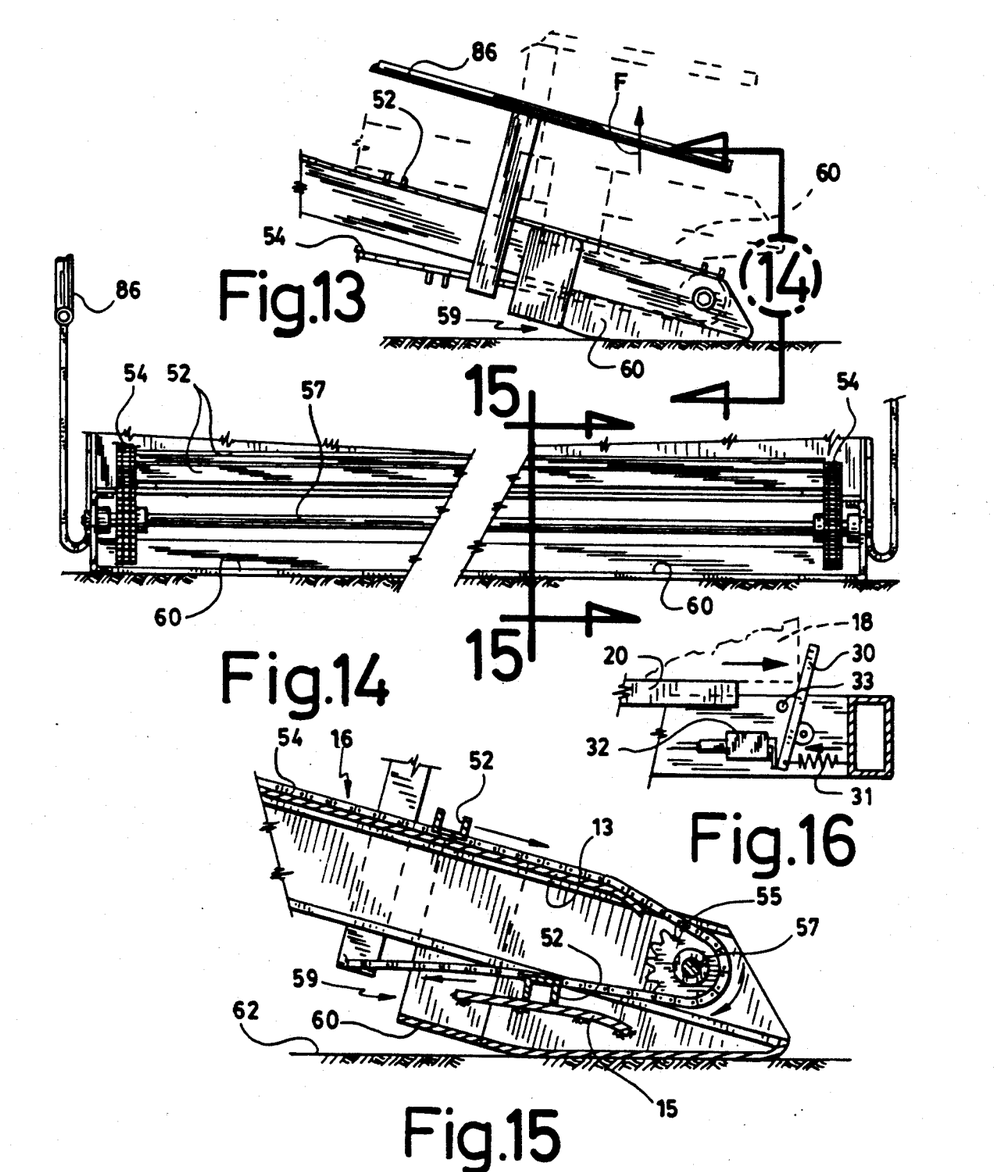
FIG. 13 is an enlarged view of encircled portion 13 shown in FIG. 1.
FIG. 14 is a rear end view of the harvester along arrows 14 shown in FIG. 13.
FIG. 15 is a cross-sectional view taken along lines 15—15 of FIG. 14.
FIG. 16 is a enlarged view of encircled portion 16 shown in FIG. 6 when a microswitch is actuated.

The skate members 59 are particularly shown in FIG. 15 and comprises a metal plate 60 which is bent from the rear of the unloading platform 16 in a forward direction and which will slide over the ground 62 while the harvester 10 moves forwardly.

Figures 17, 18, 20, 21:
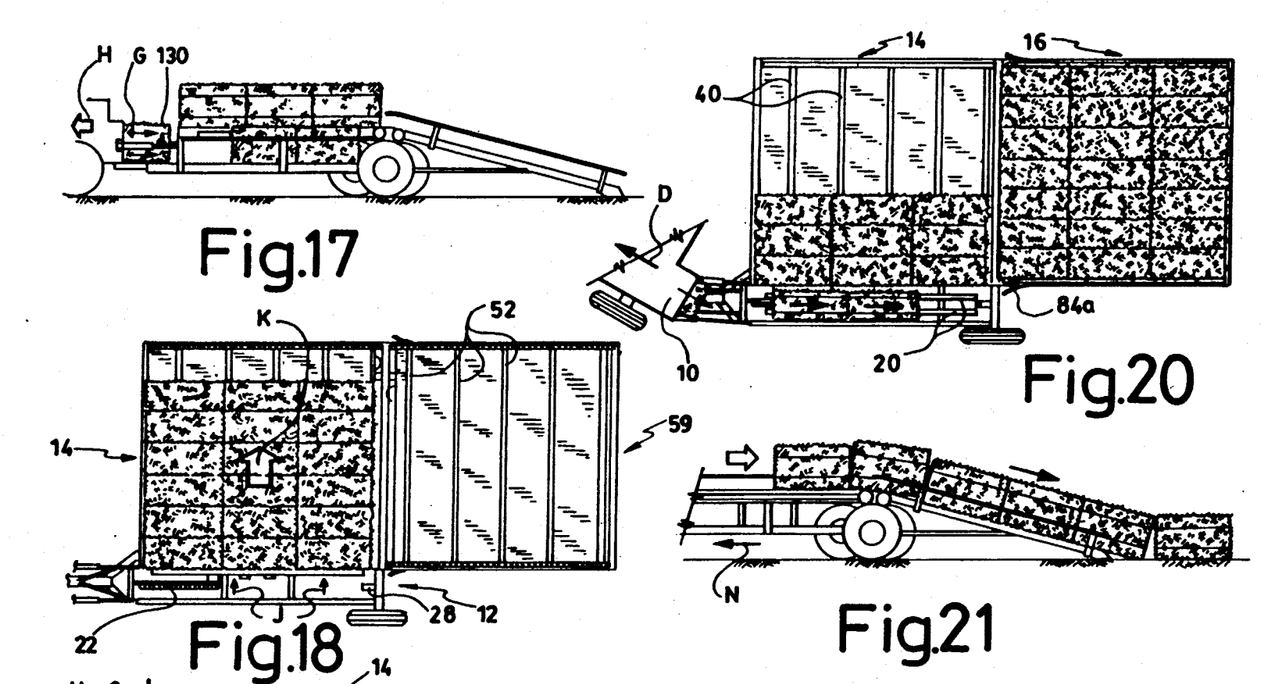
FIGS. 17–22 illustrate different steps of loading and unloading hay bales according to the invention.
Figure 19:
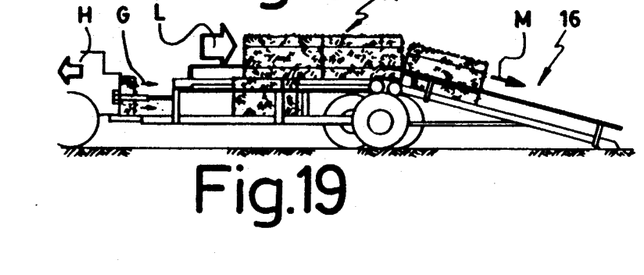

The hay baler 10 is connected to the receiving platform 12, by a pair of independent piston rods 64 and 66 pivotally hooked to the hay baler 10 by pivoting axles 68 so as to allow the baler 10 to turn in the direction of the arrow D as shown in FIG. 20. The loading platform 14 is supported by an undercarriage comprising a diagonal beam 70 and a transversal beam 72. The transversal beam 72 is supported at one end by a wheel 74 and at the other end by a pair of wheels 76 and 78 which are pivotally mounted at both ends of a connecting beam 80. A cross-beam 82 is especially intended to support the hydraulic piston 36.

The unloading platform 16 is provided with a pair of lateral ramps 84 and 86 which have deflection members 84a and 86a at their forward end adjacent the loading platform and which will guide the bales coming from the loading platform 14. The deflections are contemplated for the bales from the loading which may have slightly move outside the width between the two ramps 84 and 86.

The unloading platform stands at an angle relative to the ground so that the bales cannot slide down by themselves on the unloading platform. Only the traction of the transversal U-shaped channels 52 can activate the downward movement of the bales and the discharging operation after they have gone over the skate members 59. The leaning angle of the unloading platform 16 is generally less than 30 degrees considering that the loading platform 14 stands at about two to three feet high.

The chain 42 located on the side of the receiving platform 12, is covered by a protecting blade 90 so that the bales, when tilted from the receiving platform to the loading platform 14, will not interfere with the operation of the chain 42.

Figure 9:
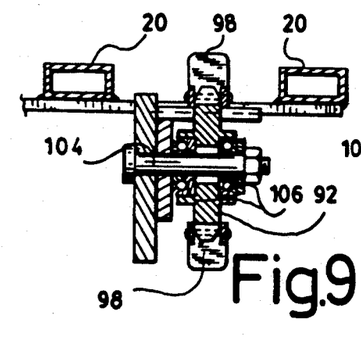
FIG. 9 is a cross-sectional view taken along line 9—9 of FIG. 8.
Figure 10:
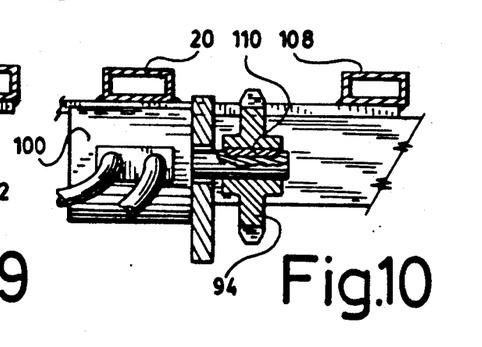
FIG. 10 is a cross-sectional view taken along line 10—10 of FIG. 8.

FIGS. 9 and 10 illustrate in greater detail the operation of the sprocket mechanism 22 which is essentially made of a pair of sprocket wheels 92 and 94 around which a chain 96 provided with a plurality of teeth 98 moves in the direction of the arrow D to drag the bales one after the other on the receiving platform 12. The movement of the sprocket wheel 94 is driven by the hydraulic motor 100. As stated above, the length of the chain 96, that is, the distance between the sprocket wheels 92 and 94 is designed to be slightly shorter than the length of a bale so that when the second bale is pushed forward by the chain 96, it will not completely reach the sensor device 28 and accordingly will not operate the hydraulic piston 36 at that stage. The piston 102 will be actuated in the direction of the arrow E only when the third bale will be completely on the receiving platform 12. FIG. 9 shows that the sprocket wheel 92 is freely mounted on the axle 104 through a ball bearing arrangement 106 while the sprocket wheel 104 is secured to the axle 108 by a key 110.

Figure 6:
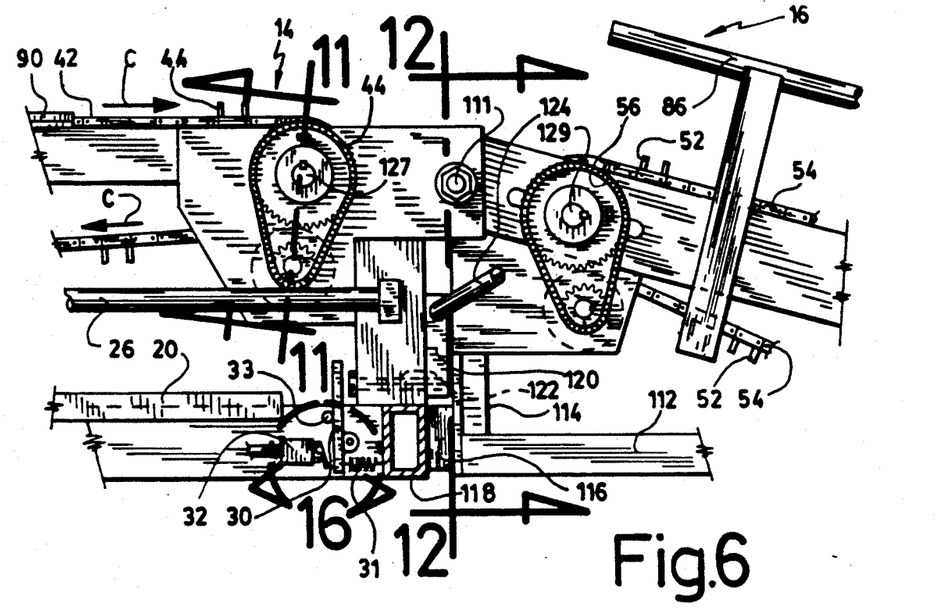
FIG. 6 is a side view of a portion of FIG. 2 along arrows 6—6 of FIG. 2.

Although the unloading platform 16 is permanently leaning backward during the operation of the harvester, it has been contemplated to raise the skate members 59 slightly above the ground when the harvester moves without the intent of dispensing bales such as when the harvester moves on a road or in the field for reaching its operating destination. For this purpose, the unloading platform 16 is provided with an undercarriage comprising horizontal beam 112 extending between a point on platform 16, intermediate its longitudinal extremities (see FIG. 1) to a vertical beam 114 extending below its forward end (see FIG. 6). A rubber damper 116 is mounted between the vertical beam 114 and a horizontal beam 118 located at the rear lower end of the loading platform 14. Above the rubber damper 116, a pivoting plate 120 is actually mounted around an axle 122. The plate 120 is adapted to vertically pivot around the axle 122 by being manually pulled downwardly by a handle 124. This operation is performed by raising the rear end of the unloading platform 16 in the direction of the arrow F, shown in FIG. 6a, for leaving a space between the rubber damper 116 and the horizontal beam 118. The plate 120 is then lowered by being pivoted around the axle 122 to fill the space between the rubber damper 116 and the beam 118.

Figures 6A, 11, 12:
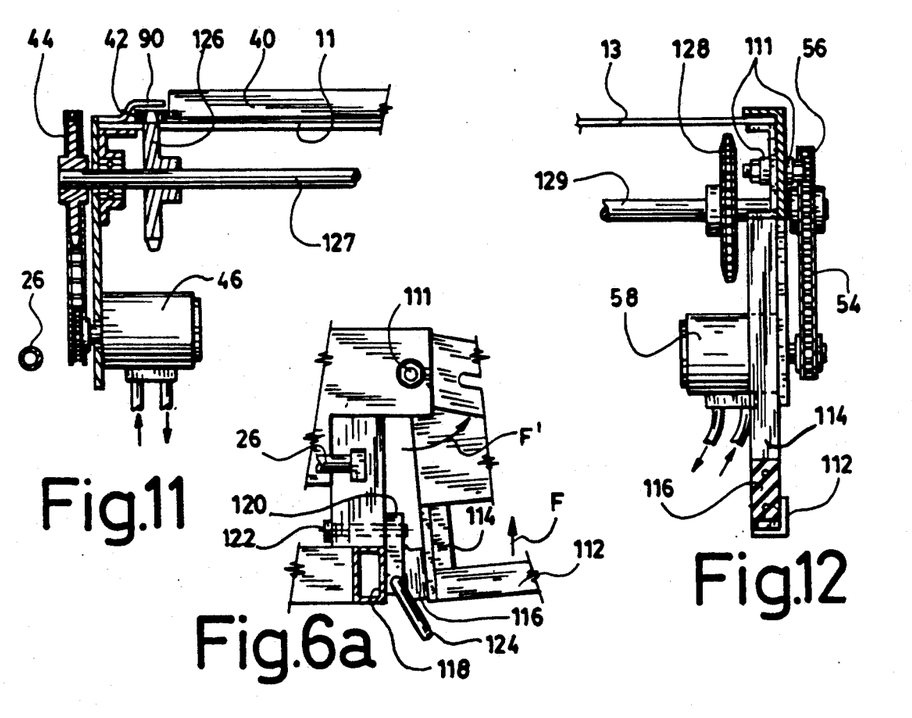
FIG. 6a shows a portion of FIG. 6 with a lever in its lower position for raising an unloading platform.
FIG. 11 is a cross-sectional view taken along line 11—11 of FIG. 6.
FIG. 12 is a cross-sectional view taken along line 12—12 of FIG. 6.
Figure 8:
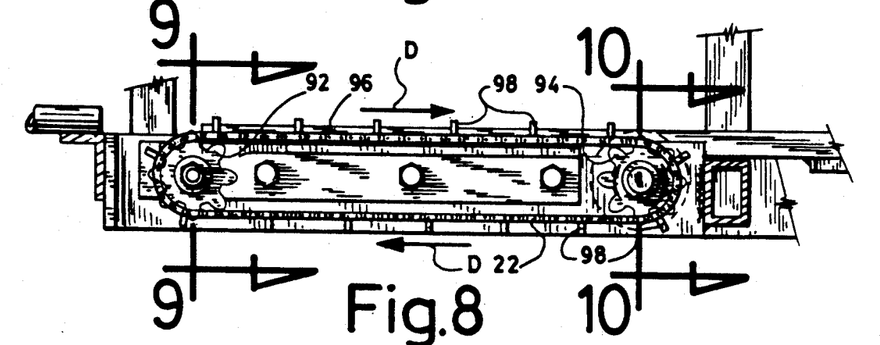
FIG. 8 is a side view of a chain and sprocket arrangement shown along arrows 8—8 in FIG. 5.

As particularly shown in FIGS. 11 and 12, the sprocket mechanism 44 and 56 drives the U-shaped channels 40 through toothed wheels 126 and 128 respectively. For the sake of clarity of FIGS. 11 and 12, the toothed wheels 126 and 128 are shown with only one example of the U-shaped channel 40 and its connection with the latter toothed wheels.

Figure 22:
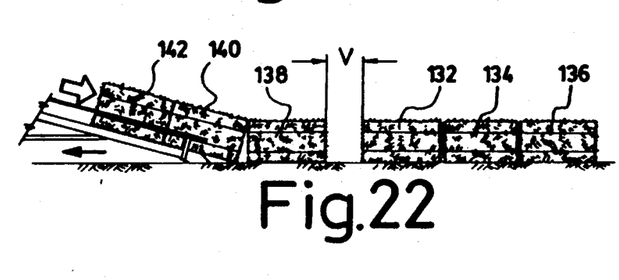

FIGS. 17-22 illustrate different stages of the operation of the harvester. FIG. 17 is a side view of the harvester showing a bale 130 moving in the direction G while the hay baler moves in the direction H. After the receiving platform 12 has been loaded, the bales are tilted in the direction of the arrows J for pushing the bales on the loading platform 14 in the direction of the arrow K. When the loading platform 14 is fully covered with bales, the operator of the harvester or an automatic sensor actuates the loading platform in the direction of the arrow L for moving the bales over the unloading platform 16 in the direction of the arrow M. The bales are moved at will by an operator and stopped at will but they are generally moved so that a complete load of the loading platform is transferred onto the unloading platform 16 and then stopped. Subsequently, as shown in FIG. 20, the loading platform 14 is subsequently filled while the hay baler 10 moves in the direction of the arrow B. As shown in FIG. 20, the hay baler is adapted to move at an angle relative to the loading and unloading platforms 14 and 16 so as to follow a back and forth pathway through the field where the hay is picked up. The advantage of the present invention allows the operator to dump the hay bales from both the loading and the unloading platform at any given location on the field. As shown in FIG. 21, the bales have started to be unloaded at the desired position while the hay baler moves in the direction of the arrow N. With this arragement, seven sets of three consecutive bales are neatly deposited on the ground in an adjacent manner these three first bales coming from the unloading platform 16 as shown in FIG. 22. Considering that the bales follow the driving chains 42 abd 54, and that the two plartforms are spaced between each other by a small distance, the next three bales 138, 140 and 142 will be distant from the first group of bales 132, 134 and 136 by a distance V, such a distance being sufficient to allow bale gripping instruments to pick up three consecutive rows of seven bales without interfering with the following three consecutive rows of bales. The distance V depends on the space between the two platforms 14 and 16 and also on the difference between the speed of the tractor pulling the baler 10 and the speed of the conveyor unloading the bales from the unloading platform. If a greater distance V is preferred, the conveyor of the unloading platform 16 is stopped momentarily after unloading a group of twwenty one bales and before unloading the next group of bales. Depending on the type of the gripping instrument used, the distance V may be more suitably extended to about four feet. Such a gripping instrument operated from a tractor, enables to pick up three consecutive rows of seven bales and to bring them onto a wagon which will transport many dozens of bales to a wearhousing location. Such a gripping implement is operated by a person which will only have to move very little to pick up all the bales left on the ground. Considering that the novel harvester will leave all the bales within a specified location, all of which are grouped by three adjacent rows of seven bales ready to be picked by the gripping implement. Such a method of operation saves on the time of operation and makes it possible to save on labor wherein additional labor would be required if the bales would be spread all over the field. Furthermore, the gripping instrument which needs to move within a very restricted area, eliminates the need of a transporting tractor.

It should be understood that the receiving platform does not form part of the purport of the invention.

I claim:

1. A mobile harvester movable on a ground surface for receiving, loading and unloading hay bales, comprising, an elongated bale receiving platform on which successive and adjacent bales, sidewisely positioned are adapted to longitudinally slide thereon in a single row, a loading platform adjacently positioned sidewise relative to said receiving platform, said loading platform being substantially at the same level as the receiving platform, means for pivoting said receiving platform for tilting a row of aligned bales on said receiving platform onto said loading platform, wherein a preceding row of aligned bales are adapted to be pushed transversally onto said loading platform when a following row of aligned bales is tilted on the loading platform, said loading platform having a supporting surface for said bales comprising a first conveyor mechanism for longitudinally moving said bales onto said supporting surface, first means for actuating said first conveyor mechanism, an unloading platform adjacently positioned lengthwise relative to said loading platform for receiving the bales from said loading platform when said first conveyor mechanism is moving, said unloading platform having a supporting surface comprising a second conveyor mechanism for consecutively moving said bales longitudinally to an end of said unloading platform opposite said loading platform, second means for actuating said second conveyor mechanism, said unloading platform leaning backwardly relative to the surface of the loading platform, said unloading platform having a skate member located at said opposite end under said unloading platform, said skate member adapted to slide on the ground surface when the harvester is moving, whereby said opposite end is adapted to lie at a level adjacent the ground to allow the bales to smoothly slide onto the ground when the second conveyor mechanism is actuated.

2. A harvester as recited in claim 1, wherein said receiving and loading platforms are mounted on wheels and located above the ground surface, said unloading platform extending downwardly from said loading platform.

3. A harvester as recited in claim 2, comprising a first sensor means for actuating said pivoting means, said first sensor means located at one end of said receiving platform and adapted to be contacted by said bales when the receiving platform is fully loaded.

4. A harvester as recited in claim 3, wherein said first and second conveyor mechanisms comprise transversal gripping beams for supporting the hay bales and moving them upon actuation of said first and second actuating means.

5. A harvester as recited in claim 4, wherein said gripping beams are U-shaped.

6. A harvester as recited in claim 5, wherein the unloading platform is slightly spaced from the loading platform for maintaining a distance between the bales on loading and unloading platforms, wherein the bales, when deposited on the ground surface maintains a gap substantially corresponding to such a distance between the bales from the loading and unloading platforms.

7. A harvester as recited in claim 3, comprising a second sensor means positioned on said loading platform at a location opposite said receiving platform for actuating said first conveyor mechanism when said one of said bales has reached a predetermined position.

8. A mobile harvester movable on a ground surface for loading and unloading hay bales, said harvester comprising, a loading platform adapted to be positioned adjacent to and sidewise relative to a receiving platform which is adapted to individually and successively supply single rows of plural bales transversely on said loading platform by lilting means, a first conveyor mechanism mounted on said loading platform for longitudinally moving said bales, said first conveyor mechanism having transversal channels for allowing the bales to transversally slide thereof and to longitudinally move the bales upon actuation of said first mechanism, means for actuating said first mechanism, an unloading platform adjacently positioned lengthwise relative to said loading platform for receiving the bales from said loading platform when said first conveyor mechanism is moving, said unloading platform having a supporting surface comprising a second conveyor mechanism for consecutively moving said bales longitudinally from one end substantially at a same level as the first mechanism to an end of said unloading platform opposite said loading platform, second means for actuating said second conveyor mechanism, said unloading platform leaning in a direction of said opposite end, said unloading platform having a skate member located at said opposite end under said unloading platform, said skate member adapted to slide on the ground when the harvester is moving, whereby said opposite end is adapted to lie at a level adjacent the ground surface to allow the bales to smoothly slide onto the ground surface when the second conveyor mechanism is actuated.

* * * * *